US012625605B2

(12) United States Patent
Wayne et al.

(10) Patent No.: US 12,625,605 B2
(45) Date of Patent: May 12, 2026

(54) CONVERTING RESTRICTED-SCROLL INTERFACE ELEMENTS WITHIN A SCROLLABLE CONTAINER TO FULLY-SCROLLABLE INTERFACE ELEMENTS

(71) Applicant: Oracle International Corporation, Redwood Shores, CA (US)

(72) Inventors: Allison Marie Wayne, Wakefield, MA (US); Chunmei Lu, Ann Arbor, MI (US); Ravindra Reddy Pochireddy, Hillsboro, OR (US)

(73) Assignee: Oracle International Corporation, Redwood Shores, CA (US)

( * ) Notice: Subject to any disclaimer, the term of this patent is extended or adjusted under 35 U.S.C. 154(b) by 214 days.

(21) Appl. No.: 18/486,421

(22) Filed: Oct. 13, 2023

(65) Prior Publication Data

US 2025/0123741 A1 Apr. 17, 2025

(51) Int. Cl.
*G06F 3/0485* (2022.01)
*G06F 3/0482* (2013.01)

(52) U.S. Cl.
CPC .......... *G06F 3/0485* (2013.01); *G06F 3/0482* (2013.01)

(58) Field of Classification Search
None
See application file for complete search history.

(56) References Cited

U.S. PATENT DOCUMENTS

| | | | | | |
|---|---|---|---|---|---|
| 2001/0011364 A1* | 8/2001 | Stoub | ................. | G06F 16/9577 | |
| | | | | | 717/100 |
| 2004/0135811 A1* | 7/2004 | Pickering | ............. | G06F 16/248 | |
| | | | | | 715/777 |
| 2006/0117051 A1* | 6/2006 | Chin | .................... | G06F 40/177 | |
| 2011/0289398 A1* | 11/2011 | Chin | ...................... | G06F 40/18 | |
| | | | | | 715/227 |
| 2013/0111330 A1* | 5/2013 | Staikos | .................. | G06F 40/10 | |
| | | | | | 715/241 |
| 2013/0117711 A1* | 5/2013 | Hayes | .................... | G06F 9/451 | |
| | | | | | 715/800 |
| 2019/0011982 A1* | 1/2019 | Wheeler | .............. | G06F 3/0481 | |
| 2022/0374230 A1* | 11/2022 | Rao | ....................... | G06F 16/248 | |

FOREIGN PATENT DOCUMENTS

KR 102036726 B1 * 10/2019 ........... G06F 17/246

OTHER PUBLICATIONS

Stackoverflow, How to make a äFixedä element Scrollable, Jan. 29, 2022. (Year: 2022).*

* cited by examiner

*Primary Examiner* — Henry Orr
(74) *Attorney, Agent, or Firm* — Invoke

(57) ABSTRACT

Operations include: presenting a Graphical User Interface (GUI) displaying a viewport of a scrollable container associated with a set of interface elements; receiving, by the GUI, user input to initiate a scrolling operation in relation to the scrollable container; responsive to determining that the interface element conversion criterion is met, converting a restricted-scroll interface element to a fully-scrollable interface element; executing the scrolling operation at least by: removing the converted fully-scrollable interface element from the viewport of the scrollable container and scrolling a second fully-scrollable interface element into the viewport.

15 Claims, 6 Drawing Sheets

Content Positioning
System
100

FIG. 2

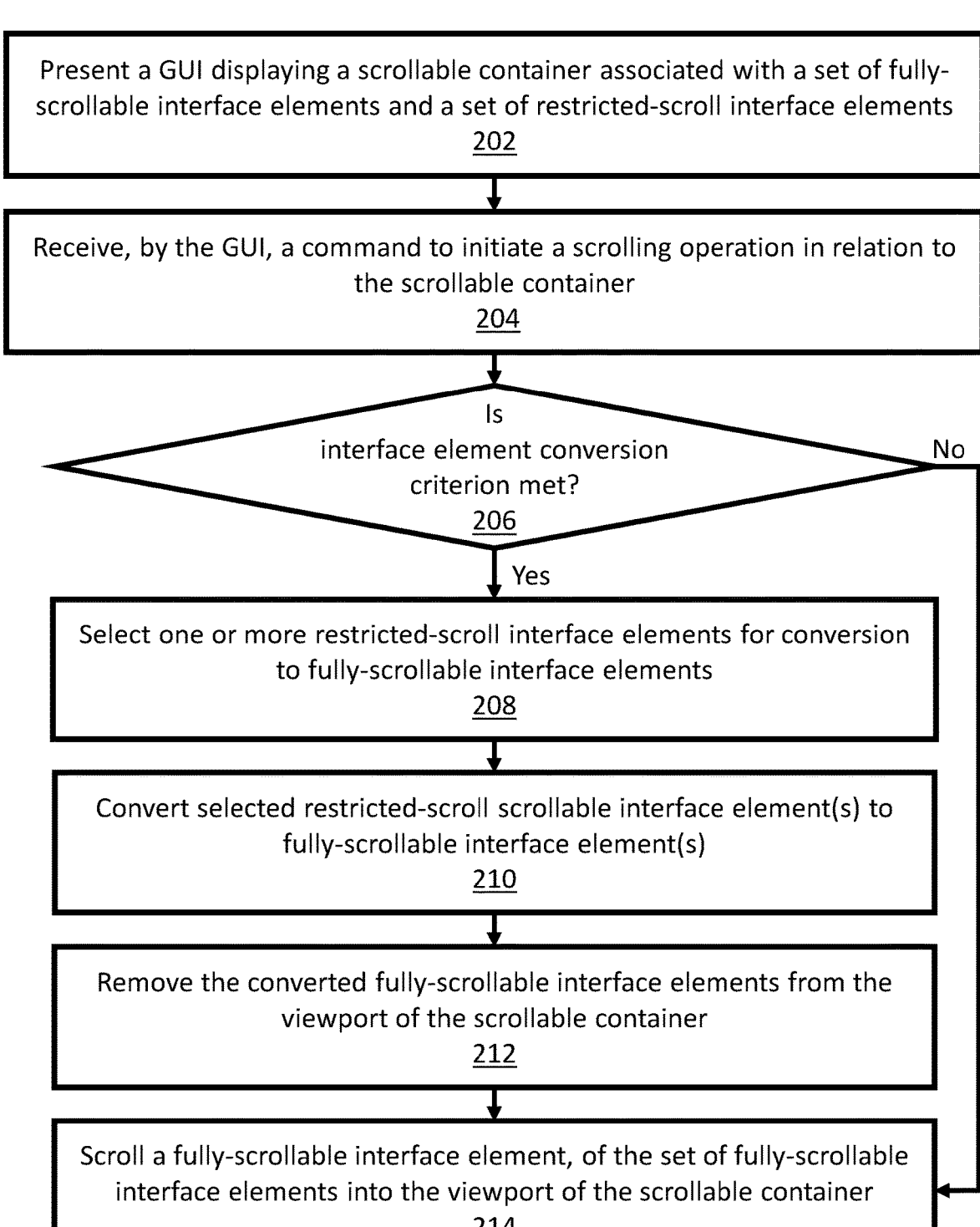

Present a GUI displaying a scrollable container associated with a set of fully-scrollable interface elements and a set of restricted-scroll interface elements
202

Receive, by the GUI, a command to initiate a scrolling operation in relation to the scrollable container
204

Is interface element conversion criterion met?
206

No

Yes

Select one or more restricted-scroll interface elements for conversion to fully-scrollable interface elements
208

Convert selected restricted-scroll scrollable interface element(s) to fully-scrollable interface element(s)
210

Remove the converted fully-scrollable interface elements from the viewport of the scrollable container
212

Scroll a fully-scrollable interface element, of the set of fully-scrollable interface elements into the viewport of the scrollable container
214

| ◇ Primary Action 1 | ◇ Primary Action 2 | ◇ Primary Action 3 |  |
|---|---|---|---|
| □ Order Number ◇ | Customer Name ◇ | Total Amount ◇ |  |
| □ F370004 | Loris Thibadeau | $7040 |  |
| □ F371007 | Jeremiah Nuanes | $4531 |  |
| □ F370006 | Tracy Mcbride | $7644 |  |
| □ F370007 | Jesse Nelson | $7612 |  |
| □ F370008 | Daisy Liddicoat | $2757 |  |
| □ F371011 | Andrea James | $4327 |  |
| □ F370010 | Joshua Nelson | $3616 |  |
| □ F371013 | James Smith | $3670 |  |
| □ F370012 | Michelle Remirez | $10819 |  |
| □ F371015 | Sam Rueb | $3078 |  |
| □ F371016 | Tim Genco | $3749 |  |
| □ F370015 | Jeffery Coleman | $4088 |  |
| □ F370016 | Eva Ogatius | $13392 |  |
| □ F371019 | August Arouri | $3872 |  |
| □ F371020 | Ralph Foster | $5486 |  |

General Overview Page Header ▤ Create/Edit Page Header ≡ Create/Edit Drawer Template Scroll bar 326

Restricted-Scroll Interface Element 324d

Restricted-Scroll Interface Element 324e

Fully-Scrollable Interface Elements 322

Fully-Scrollable Interface Element 322i

Restricted-Scroll Interface Element 324f

Scrollable container 300

FIG. 3B

CONVERTING RESTRICTED-SCROLL INTERFACE ELEMENTS WITHIN A SCROLLABLE CONTAINER TO FULLY-SCROLLABLE INTERFACE ELEMENTS

TECHNICAL FIELD

The present disclosure relates to converting restricted-scroll interface elements within a scrollable container to fully-scrollable interface elements.

BACKGROUND

Graphical User Interfaces (GUIs) are used for presenting content items. Some examples of content items that are presented within GUIs include, but are not limited to, text, images, maps, diagrams, videos, games, presentations, records in a data table, and notifications. A GUI may present a content item within a scrollable container. A scrollable container is a container that is associated with a set of interface elements. Each interface element may be associated with a corresponding content item that is displayed by the interface element. Displaying an interface element within a viewport of a scrollable container may be referred to herein as displaying the interface element within the scrollable container. Displaying an interface element includes displaying the content item associated with the interface element.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 2 illustrates a set of operations for converting restricted-scroll interface elements to fully-scrollable interface elements in accordance with one or more embodiments;

FIGS. 3A-3B illustrate an example embodiment;

DETAILED DESCRIPTION

Figure 1A:
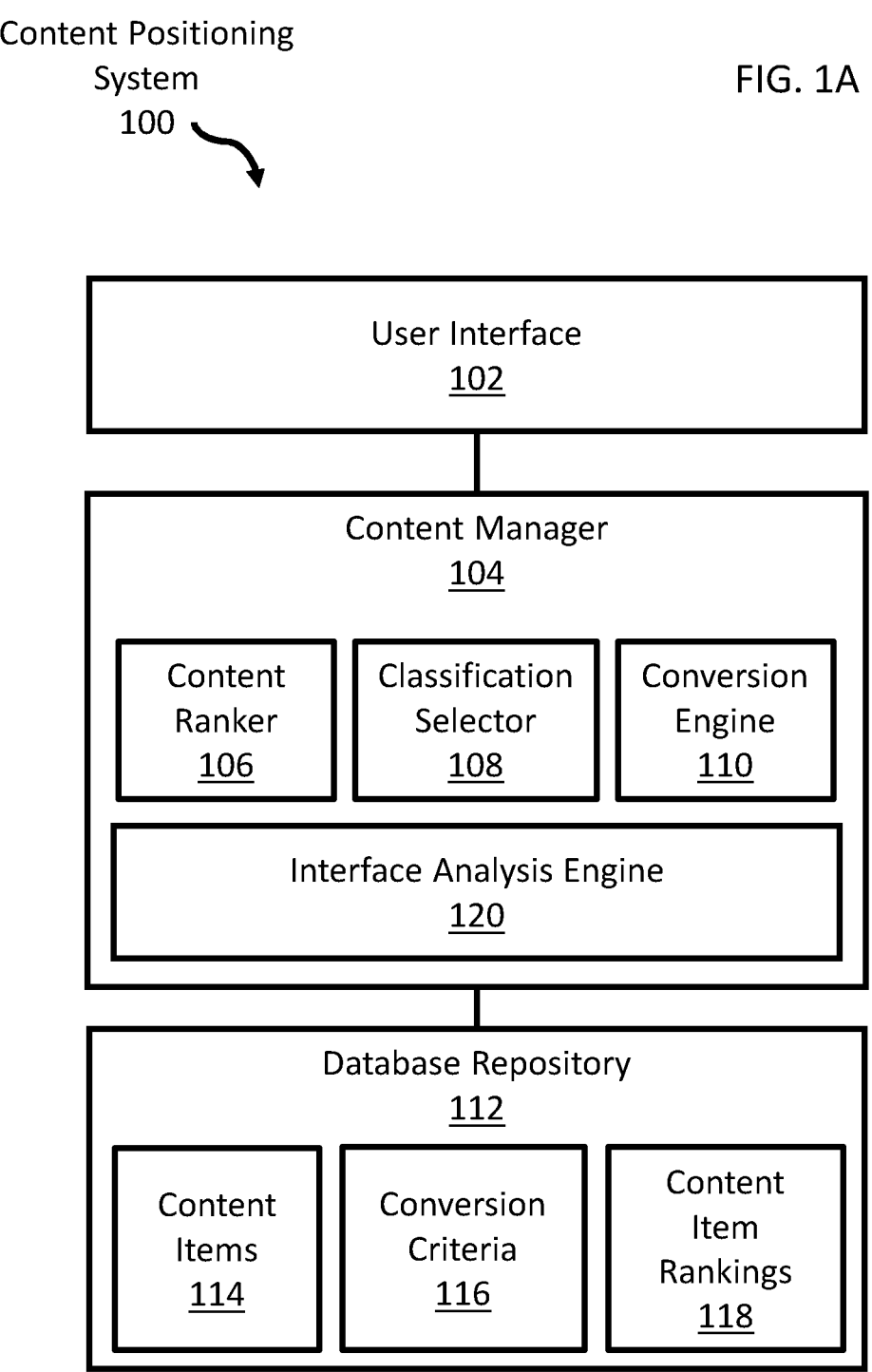
FIGS. 1A-1B illustrate a content positioning system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. INTRODUCTION
2. GENERAL OVERVIEW
3. CONTENT POSITIONING SYSTEM

4. SELECTIVELY CONVERTING RESTRICTED-SCROLL INTERFACE ELEMENTS TO FULLY-SCROLLABLE INTERFACE ELEMENTS
5. EXAMPLE EMBODIMENT
6. HARDWARE OVERVIEW

1. Introduction

As described above, a GUI may display interface elements within a viewport of a scrollable container. Any interface element that is not initially displayed within a viewport may be moved into and therefore, displayed within the viewport in response to a scrolling operation. When an interface element is moved out of the viewport in response to a scrolling operation, the interface element is no longer visible within the GUI.

Interface elements that may be moved into and out of a viewport of a scrollable container based on any currently available scrolling operations, are referred to herein as fully-scrollable interface elements. A scrolling operation may move a fully-scrollable interface element, within the viewport, toward any edge of the viewport. When a home position corresponding to the fully-scrollable interface element is moved past an edge of the viewport, the fully-scrollable interface element, that is synchronized with the home position, is removed from the viewport. The fully-scrollable interface element may also be removed from the viewport when a position corresponding to the fully-scrollable element is moved past restricted-scroll interface elements that are stuck at the edge of the viewport, as further described below.

Interface elements that have scrolling restrictions are referred to herein as restricted-scroll interface elements. The restrictions for scrolling a restricted-scroll interface element out of a viewport of a scrollable container, as described below, may apply immediately if the initial display of the scrollable container includes the restricted-scroll interface element in the viewport. If the initial display of the scrollable interface does not include the restricted-scroll interface element, the restrictions apply after the restricted-scroll interface element has been scrolled into the viewport of the scrollable container. Restricted-scroll interface elements may include partially-scrollable interface elements and non-scrollable interface elements.

Partially-scrollable interface elements may or may not be moved out of a viewport depending on a direction of a scrolling operation that is being executed. A viewport has multiple edges. Each scrolling operation of a set of available scrolling operations may move a partially-scrollable interface element, currently within the viewport of a scrollable container, toward a particular edge of the multiple edges of the viewport. When a home position of the partially-scrollable interface element is moved past an edge of the viewport during a scrolling operation, the partially-scrollable interface element may either stick to the edge of viewport without being removed from the viewport, or may be removed from the viewport. A partially-scrollable interface element is configured such that the partially-scrollable interface element (a) sticks to at least one edge of the viewport and (b) does not stick to at least one other edge of that viewport.

A partially-scrollable interface element sticking to an edge of the viewport, as referred to herein, includes the partially-scrollable interface element stopping movement at the edge, without being removed from the viewport, during a scrolling operation. The scrolling operation may be continued in the same direction, moving a home position of the partially-scrollable interface element as well as other interface elements out of the viewport, without impacting the position of the partially-scrollable interface element that is now stuck at the edge. Sticking to an edge of the viewport, as referred to herein, may also include stopping movement when the partially-scrollable interface element reaches other interface elements that are also stuck to the same edge. In this scenario, the partially-scrollable interface may stop movement prior to reaching edge, and therefore not being directly adjacent to the edge. The partially-scrollable interface element may instead stop adjacent to another stopped interface element that is directly adjacent to the edge. Multiple different partially-scrollable interface elements and/or non-scrollable interface elements may be stuck to an edge of a viewport while other interface elements are moved out of the viewport.

A partially-scrollable interface element not sticking to an edge of the viewport, as referred to herein, includes the partially-scrollable interface element being removed from the viewport during a scrolling operation when a home position of the partially-scrollable interface element is moved past that edge of the viewport. Not sticking to an edge of the viewport, as referred to herein, may also include being removed from the viewport when a home position of the partially-scrollable interface element is moved past other interface elements that are stuck to the edge of the viewport. In this scenario, the partially-scrollable interface may be removed from the viewport prior to reaching the edge of the viewport.

In an example, a partially-scrollable interface element is scrolled into a viewport by a downward scrolling operation that moves content upward. The downward scrolling operation brings a partially-scrollable interface element, that is not currently within the viewport, into the viewport at a bottom edge of the viewport. The downward scrolling operation can further move the partially-scrollable interface element upward within the viewport until the partially-scrollable interface element reaches and sticks to the top edge of the viewport, without moving out of the viewport. Accordingly, the downward scrolling operation does not move the partially-scrollable interface element out of the viewport from the top edge of the viewport. The downward scrolling operation may move a home position associated with the partially-scrollable interface element out of the viewport. Subsequently, the system may execute an upward scrolling operation. The partially-scrollable interface element may be moved out of the viewport by the upward scrolling operation that moves content downward. The upward scrolling can move the partially-scrollable interface element down from a top edge of the viewport toward the bottom edge of the viewport. When a home position of the partially-scrollable interface element is returned to the viewport, a position of the partially-scrollable interface is synchronized with the home position. The continuation of upward scrolling operation can further move both the home position and the partially-scrollable interface element out of the viewport at the bottom edge of the viewport.

Interface elements that cannot be scrolled out of a viewport regardless of scrolling direction are referred to herein as non-scrollable interface elements. Non-scrollable interface elements stick to each edge of a viewport of a scrollable container. Accordingly, when a scrolling operation moves a non-scrollable interface element towards an edge of the viewport, the non-scrollable interface element stops moving when the non-scrollable interface element reaches the edge of the scrollable container. Alternatively, the non-scrollable interface element stops moving when the non-scrollable interface element reaches other interface elements stuck at the edge. Accordingly, a non-scrollable interface element may stop moving during a scrolling operation before the non-scrollable interface element reaches the edge of the viewport.

A "fixed" non-scrollable interface element is a subtype of a non-scrollable interface element type. A "fixed" non-scrollable interface element is included in a viewport at the initial display of the scrollable container. Furthermore, a "fixed" non-scrollable interface element is maintained at a fixed location within the viewport regardless of any scrolling operations.

A non-scrollable interface element, that is already within the viewport, has a dedicated amount of space within the scrollable container as the non-scrollable interface element is maintained within the scrollable container, regardless of scrolling operations. A partially-scrollable interface element has a dedicated amount of space within the scrollable container during a scrolling operation in a particular direction if the partially-scrolling interface element cannot be scrolled out of the viewport in that particular direction. The partially-scrollable interface element does not have a dedicated amount of space within the scrollable container during another scrolling operation in another direction that allows for scrolling the partially-scrollable interface element out of the viewport. Fully-scrollable interface elements do not have any dedicated amount of space within the scrollable container. The space remaining in the scrollable container, that is not dedicated to non-scrollable interface elements and not currently dedicated partially-scrollable interface elements, is used for displaying fully-scrollable interface elements. The space used to display and scroll through fully-scrollable interface elements may thus be limited and subject to the space used by the restricted-scroll interface elements.

2. General Overview

One or more embodiments convert a restricted-scroll interface element within a displayed scrollable container to a fully-scrollable interface element. The conversion is performed in response to determining that an interface element conversion criterion is met.

The system presents a GUI displaying a scrollable container associated with interface elements. The interface elements, associated with the scrollable container, include a set of fully-scrollable interface elements, and one or more restricted-scroll interface elements. The restricted-scroll interface elements may include partially-scrollable interface elements and/or non-scrollable interface elements, as described herein. While displaying at least one restricted-scroll interface element and a subset of the fully-scrollable interface elements in the scrollable container, the GUI receives a command in relation to the scrollable container for initiating a scrolling operation. Based at least in part on the command, the system determines whether an interface element conversion criterion is met. In response to determining that the interface element conversion criterion is met, the system converts the at least one restricted-scroll interface element to a fully-scrollable interface element. The converted fully-scrollable interface element may now be scrolled into and out of the viewport of the scrollable container in any available scrolling direction, similar to other fully-scrollable interface elements.

Conversion of the restricted-scroll interface element to a fully-scrollable interface element frees up space within the scrollable container that was previously dedicated for the restricted-scroll interface element. This freed-up space may now be used to increase a size of a display region being used for displaying the fully-scrollable interface elements. The system executes the scrolling operation, resulting in moving fully-scrollable interface elements into and out of the viewport of the scrollable container. While executing the scrolling operation, the system maintains any non-scrollable interface elements within the scrollable container regardless of a direction of the scrolling operation. Furthermore, while executing the scrolling operation, the system maintains a partially-scrollable interface element within the viewport of the scrollable container if the direction of the scrolling operation does not allow for removing of the partially-scrollable interface element from the viewport. The movement of the partially-scrollable interface element stops at a position close or adjacent to an edge of the viewport of the scrollable container, rather than leave the viewport.

One or more embodiments reduce a size of a restricted-scroll interface element within a displayed scrollable container. The system determines whether an interface element modification criterion is met. If the interface element modification criterion is met, then the system reduces a size of at least one restricted-scroll interface element. Reducing a size of a restricted-scroll interface element results in increasing an amount of space within the scrollable container that is used for displaying the fully-scrollable interface elements. The system may also altogether remove a restricted-scroll interface element from the displayed scrollable container.

One or more embodiments described in this Specification and/or recited in the claims may not be included in this General Overview section.

3. Content Positioning System

FIG. 1A illustrates an example content positioning system 100 in accordance with one or more embodiments. The system 100 may include more or fewer components than the components illustrated in FIG. 1A. The components illustrated in FIG. 1A may be local to or remote from each other. The components illustrated in FIG. 1A may be implemented in software and/or hardware. Each component may be distributed over multiple applications and/or machines. Multiple components may be combined into one application and/or machine. Operations described with respect to one component may instead be performed by another component.

In an embodiment, the content positioning system 100 includes a user interface 102. The user interface 102 is a graphical user interface (GUI), featuring visual elements such as text, icons, buttons, menus, windows, etc. The GUI may be used in operating systems, software applications, websites, among other applications. The user interface 102 enables interaction between a user and the system 100. Users may interact with the GUI using a combination of mouse clicks, keyboard inputs, and touch gestures. The user interface 102 may be a touch interface, designed for touch-enabled devices like smartphones and tablets using gestures like tapping, swiping, pinching, and dragging to navigate and interact with content item. The interface 102 may be a Web user interface (Web UI), where the user interface elements are designed for websites and Web applications. The Web UI may include elements like navigation menus, forms, buttons, and interactive content item. The user interface 102 may encompass the visual and interactive elements through which users interact with and control a digital product or service. In one example, the interaction between the users and the interface 102 is performed by scrolling of the visual and interactive elements.

Figure 1B:
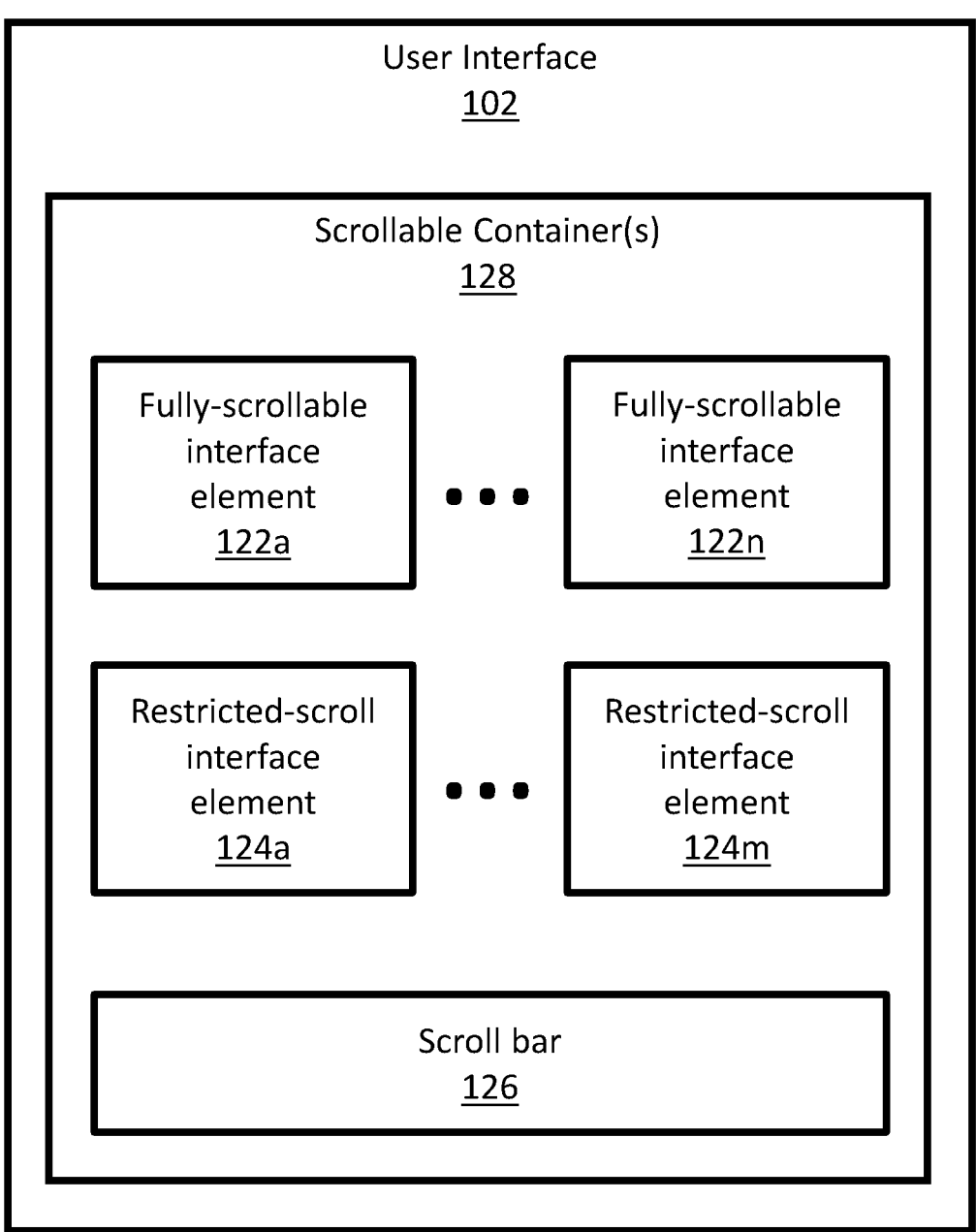

An example set of components that may be included within user interface 102 is illustrated in FIG. 1B. As illustrated in FIG. 1B, the user interface 102 displays a scrollable container(s) 128, fully-scrollable interface element(s) 122a-122n, restricted-scroll interface element(s) 124a-124m, and a scroll bar(s) 126. The user interface 102 may display additional components that are not illustrated in FIG. 1B. Components illustrated within FIG. 1B may be omitted, rearranged, or otherwise modified in accordance with one or more embodiments.

As described above, a scrollable container 128 is a container that is associated with a set of interface elements. The scrollable container 128 may encompass the entire user interface 102 or a portion of the user interface 102. A portion of a user interface 102 that corresponds to a scrollable container 128 may be referred to herein as a drawer or frame. The scrollable container 128 includes a viewport. A viewport of the scrollable container 128 corresponds to a viewable portion of the GUI corresponding to the scrollable container 128. Interface elements, associated with a scrollable container 128, may be visibly displayed by the GUI in a viewport of the scrollable container 128. Displaying an interface element within a viewport of a scrollable container 128 may be referred to herein as displaying the interface element within the scrollable container 128. When an interface element is moved out of the viewport of the scrollable container 128 during a scrolling operation in response to a scrolling command, the interface element is no longer visible within the GUI. Each interface element of a scrollable container 128 may be associated with a corresponding content item. Displaying an interface element includes displaying the content item associated with the interface element. Interface elements may be organized, aligned, and/or structured within the scrollable container 128.

In some cases, a combined display size of the interface elements associated with the scrollable container 128 may be smaller than the available screen real estate or size of a viewport corresponding to the scrollable container 128. When the combined display size of the interface elements is smaller than the available screen real estate, all of the interface elements may be concurrently be displayed with the scrollable container 128.

In some cases, a combined display size of the interface elements associated with the scrollable container 128 exceeds the available screen real estate or size of a viewport corresponding to the scrollable container 128. When the combined display size of the interface elements exceeds the available screen real estate, all of the interface elements cannot concurrently be displayed with the scrollable container 128. Some of the interface elements, associated with the scrollable container 128, are displayed within the scrollable container 128 and other interface elements associated with the scrollable container 128 are not displayed. A scrolling operation may be used to display the currently non-displayed interface elements. When user input is received for scrolling through the scrollable container 128, the interface elements move positions within the displayed scrollable container 128. In an example, user input includes a downward scrolling command in relation to a scrollable container 128. In response to the downward scrolling command, the interface elements currently displayed, within the scrollable interface, move upward. Some of the interface elements previously shown at the top of the scrollable container 128 are no longer visible. Furthermore, additional interface elements, that were previously not displayed, are now displayed at the bottom of the scrollable container 128.

Interface elements that may be moved into and out of a viewport based on any currently available scrolling operations, are referred to herein as fully-scrollable interface elements. Fully-scrollable interface elements 122 may be referred to herein as "non-sticky" interface elements because fully-scrollable interface elements 122 do not "stick" to a viewport of the scrollable container 128. Specifically, fully-scrollable interface elements 122 do not stick to any edge of the viewport and therefore can be moved out of the viewport at any edge as a result of executing available scrolling operations. Non-sticky, fully-scrollable interface elements are not continuously displayed within the viewport of the scrollable container 128. Fully-scrollable interface elements 122 may be added to and removed from a viewport of a scrollable container 128 during available scrolling operations. Accordingly, fully-scrollable interface elements 122, associated with a scrollable container 128, may or may not be displayed within the scrollable container 128 depending on a scroll position associated with the scrollable container 128.

Interface elements that have scrolling restrictions are referred to herein as restricted-scroll interface elements 124. Restricted-scroll interface elements 124 may include partially-scrollable interface elements and non-scrollable interface elements.

Partially-scrollable interface elements can be moved into the viewport by scrolling in one direction and out of the viewport by scrolling in another direction. In other words, partially-scrollable interface elements can be scrolled in and out of a viewport at one edge of the viewport and cannot be scrolled in and out of the viewport at another edge of the viewport. Interface elements that cannot be scrolled out of a viewport regardless of scrolling direction are referred to herein as non-scrollable interface elements.

In an example, a partially-scrollable interface element is not initially displayed in a viewport of a scrollable container. The home position of the partially-scrollable interface element is below a subset of interface elements, being displayed in the viewport, in a sequence of interface elements. When a downward scrolling operation is executed in response to a scrolling command, a home position of the partially-scrollable interface element within the sequence of interface elements is moved into the viewport of the scrollable container from the bottom edge of the scrollable container. Moving the home position of the partially-scrollable interface element into the viewport results in displaying the partially-scrollable interface element within the viewport. As the down scrolling operation is continued, the home and the partially-scrollable interface element move up in sync until the home position is entirely out of viewport. The partially-scrollable interface element continues to move upward in sync with the home position until the partially-scrollable interface element reaches and stops at a position close to the top of the scrollable container. The partially-scrollable interface element may stop at a position directly adjacent to the top edge of the scrollable container or adjacent to a set of other partially-scrollable and/or non-scrollable interface elements that are directly adjacent to the top edge of the scrollable container. The partially-scrollable interface element may be referred to as a "sticky" interface element because it sticks to an edge of the viewport even though the home position of the scrollable container has been moved out of the viewport. The partially-scrollable interface element is no longer in sync with the home position since the home position has moved out of the viewport while the partially-scrollable interface element remains within the viewport. The reason the partially-scrollable interface element stops at the position close to the top edge of the scrollable container is because, in this particular example, the partially-scrollable interface element is (a) configured to stick to the top edge of the scrollable container and/or (b) configured not to move out of the viewport with a downward scrolling operation. The downward scrolling operation can only move the partially-scrollable interface element into the viewport from the bottom edge of the scrollable container. An upward scrolling operation can, however, move the partially-scrollable interface element out of the viewport from the bottom edge of the scrollable container. When an upward scrolling operation is subsequently initiated, the partially-scrollable interface remains at the position close to the top of the scrollable container until the home position returns to the viewport from the top edge of the scrollable container. Once the home position returns to the viewport from the top edge of the scrollable container, the partially-scrollable interface element re-synchronizes with home position. The partially-scrollable interface element moves down and out of the viewport from the bottom edge in sync with the home position.

As described above, interface elements that cannot be scrolled out of a viewport regardless of scrolling direction are referred to herein as non-scrollable interface elements. Non-scrollable interface elements may be displayed within the scrollable container from the initial display of the scrollable container. Restricted-scroll interface elements 124, that are maintained within a scrollable container 128, may or may not have fixed positions within the scrollable container 128. Some non-scrollable interface elements that are maintained at a position close to a particular edge of a scrollable container are referred to herein as "fixed" non-scrollable interface elements. The non-scrollable interface element is maintained at a fixed position such as, for example, a top, bottom, or side of the scrollable container 128. When a non-scrollable interface element has a fixed position, a scrolling operation may not have any impact on a position of the non-scrollable interface element within the scrollable container 128.

Some non-scrollable interface elements, that are not initially displayed within the scrollable container, can be moved into a viewport. Non-scrollable interface elements may be moved into and displayed within the viewport based on the movement of a corresponding home position, as described above with reference to the partially-scrollable interface elements. However, once displayed within the viewport, non-scrollable interface elements cannot be removed from the viewport during any scrolling operations.

Restricted-scrolling interface elements may have dedicated space within the scrollable interface. Each non-scrollable interface element, that is already within the viewport, has a dedicated amount of space within the scrollable container as each non-scrollable interface element is maintained within the scrollable container, regardless of scrolling operations. Each partially-scrollable interface element has a dedicated amount of space within the scrollable container during a scrolling operation in a particular direction if the partially-scrolling interface element cannot be scrolled out of the viewport in that particular direction. The partially-scrollable interface element does not have a dedicated amount of space within the scrollable container during another scrolling operation in another direction that allows for scrolling the partially-scrollable interface element out of the viewport. Fully-scrollable interface elements do not have any dedicated amount of space within the scrollable container. The space remaining in the scrollable container, that is not dedicated to non-scrollable interface elements and not currently dedicated partially-scrollable interface elements, is used for displaying fully-scrollable interface elements. The space used to display and scroll through fully-scrollable interface elements may thus be limited and subject to the space used by the restricted-scroll interface elements 124.

In one example, the restricted-scroll interface elements 124 display standard buttons, such as "Submit" or "Cancel". The buttons are designed to trigger an action when clicked. The restricted-scroll interface elements 124 may display icons that are visual representations of actions or concepts. The icons may be used in toolbars, navigation bars, or menus to provide quick access to functions without the need for scrolling. Moreover, restricted-scroll interface elements 124 may include labels that provide a brief description or title for other interface elements. The restricted-scroll interface elements 124 can further display text that provides information or instructions, such as captions, subtitles, or tool tips. The restricted-scroll interface elements 124 may display alerts and notification. As an example, the restricted-scroll interface elements 124 may display messages that inform users about certain events or actions. The restricted-scroll interface elements 124 may be indicators that show the status of a system, such as battery level, signal strength, or network connectivity. Further, the restricted-scroll interface elements 124 may include shortcuts that provide access to frequently used features or settings that ensure accessibility.

A scrollable container 128 may include a scroll bar 126 that is used by a user to traverse through interface elements associated with the scrollable container 128. The scroll bar 126 may be displayed within the scrollable container 128 or external to the scrollable container 128. The scroll bar 126 of the user interface 102 allows a user to submit user input to initiate a scrolling operation. The scroll bar 126 may refer to a visible, selectable interface element on the user interface 102, or simply a scrolling functionality without a visible component displayed on the user interface 102. The scroll bar 126 may correspond to a scrolling functionality that is initiated by dragging a button on the scroll bar 126, or selecting arrows on the scroll bar 126. The scrolling functionality, of the scroll bar 126, may be initiated by a mouse wheel, keyboard, or trackpad without directly selecting or interacting with any displayed interface elements.

The scroll bars 126 may be vertical and/or horizontal scroll bars that appears on the side and/or bottom of the user interface 102. Users can click and drag a scroll bar 126 to scroll up, down, left, or right through a display of interface elements. The scroll bar may be located on touch-enabled devices, like smartphones and tablets, where users can activate the corresponding scrolling functionality by swiping their fingers up or down on the screen. Touch gestures also include pinch-to-zoom, which allows users to zoom in or out on content item.

In an embodiment, a scroll bar controls a home position associated with each interface element in a sequence of interface elements. When a home position and a corresponding interface element are out of sync (e.g., because interface element is a partially-scrollable interface element that is stuck to an edge of a scrollable container), the scroll bar 126 continues to control the home position associated with the interface element. When the home position and the corresponding interface element are back in-sync, the scroll bar controls both the home position and the interface element.

In websites and applications, infinite scrolling may automatically load and display more content items as the user reaches the end of currently loaded content items. Infinite scrolling may be used, for example, in social media feeds. In one example, parallax scrolling is used, where background and foreground elements scroll at different rates, creating a sense of depth and interactivity, and in another example, accordion menus show and hide content item sections, allowing users to expand and collapse sections of content item. In mobile apps, swipe navigation may be used to move between different pages or sections horizontally.

Returning to FIG. 1A, the content positioning system 100 includes a database repository 112 in accordance with one or more embodiments. In an embodiment, a data repository 112 is any type of storage unit and/or device (e.g., a file system, database, collection of tables, and/or any other storage mechanism) for storing data. As illustrated in FIG. 1A, the data repository 112 may be configured to store content items 114, conversion criteria 116, and content item rankings 118, each of which is discussed in further detail herein. The data repository 112 may include multiple different storage units and/or devices. The multiple different storage units and/or devices may or may not be of the same type or located at the same physical site. The data repository 112 may be implemented or executed on the same computing system as and/or a separate computing system from the content manager 104 and/or the Interface analysis engine 120. Content item 114, conversion criteria 116, and content item rankings 118 may be implemented across any of the components of the system 100. However, these datasets are illustrated within the data repository 112 for purposes of clarity and explanation. The data in the repository 112 may be managed by the content manager 104 to be presented and accessible to the user in the user interface 102. In one or more embodiments, content items 114 include any content items that may be displayed by the user interface 102. The content item 114 may include, for example, text, graphics, icons, notifications, alerts, and interactive elements (e.g., buttons, toolbars, etc.). A interface element may display a corresponding content item 114, as described herein. When a content item is selected for display, the interface element corresponding to the content item is displayed. When a content item is not selected for display, the interface element corresponding to the content item is not displayed. A single content item 114, as referred to herein, may include one or more data sets, records, images, etc.

in one or more embodiments, the conversion criteria 116 defines one or more criteria that are evaluated to determine whether to convert a restricted-scroll interface element 124 to a fully-scrollable interface element 122. the conversion criteria 116 may define conditions for triggering conversions. when the conditions defined by the conversion criteria 116 are met, the system triggers an interface element conversion as described below with reference to FIGS. 2a-2b. the conversion criteria 116 defines, for example, a minimum size for displaying a set of fully-scrollable interface elements 122 associated with a scrollable container 128. the minimum size may refer to a measured size of a fully-scrollable interface element, for example, a number of inches used for displaying fully-scrollable interface elements 122 associated with the scrollable container 128. the minimum size may refer to a minimum percentage of a gui or of a scrollable container 128 that is used for displaying fully-scrollable interface elements 122 associated with the scrollable container 128. the conversion criteria 116 specifies a condition that triggers an interface element conversion when a minimum space for displaying a set of fully-scrollable interface elements 122 is not met.

In another embodiment, the conversion criteria 116 defines a maximum size for displaying a set of restricted-scroll interface elements 124 associated with a scrollable container 128. Similar to the minimum size, the maximum size may refer to a measured size or percentage. For example, the conversion criteria 116 may limit the display region for restricted-scroll interface elements to a maximum of 40% of the space available in the scrollable container 128. When the collection of one or more restricted-scroll interface elements takes up space that is greater than 40% of the available GUI space during a scrolling operation (condition), the system triggers interface element conversion operations as described herein. The element conversion operation converts at least one of the restricted-scroll interface elements to a fully-scrollable interface element. The conversion results in an increase in an amount of space used for display of fully-scrollable interface elements and a decrease in an amount of space used for display of restricted-scroll interface elements.

The conversion criteria 116 may be selected based on a current context or action being executed in relation to the GUI. As an example, the conversion criteria 116 may define different minimum sizes for displaying fully-scrollable interface elements 122 during a downward scrolling operation, an upward scrolling operation, and a state with no active scrolling operation, respectively. The conversion criteria 116 may be selected based on a speed of a scrolling operation.

The conversion criteria 116 may be user-defined. The conversion criteria 116 may be based on accessibility requirements associated with the user interface 102. The accessibility requirements may be identified by executing a query or may be received from a user. The conversion criteria 116 may be modified based on changes to accessibility requirements.

The conversion criteria 116 may be based on characteristics of the scrollable container 128. As an example, conversion criteria 116 may selected as a function of a vertical height of the scrollable container 128. When a vertical height of the scrollable container 128 is less than a threshold value, the conversion criteria may define minimum height for a region of the scrollable container 128 used for displaying fully-scrollable interface elements 122. When the vertical height of the scrollable container 128 is greater than the threshold value, the conversion criteria may define a minimum percentage height, of the total height of the scrollable container 128, for display of the fully-scrollable interface elements 122. The height-based conversion criteria may be different when the user interface 102 is displayed on a mobile device compared to when the user interface 102 is displayed on a desktop computer.

The conversion criteria 116 may be determined based on the characteristics of a frame (also referred to a "drawer"), within the GUI, that includes the fully-scrollable interface element. As an example, a height of a frame, within the GUI, that includes the scrollable container 128 is used to determine the conversion criteria 116.

In one or more embodiments, the data repository 112 includes modification criteria (not illustrated). The modification criteria is similar to the conversion criteria, as described above. In response to determining that the modification criteria is met, the system permanently or temporarily modifies a size of at least one restricted-scroll interface element 124. For example, the system may reduce a size of a restricted-scroll interface element 124 to reduce an amount of dedicated space being used for a set of restricted-scroll interface elements 124. The now freed-up space within the scrollable container 128 is used to display the fully-scrollable interface elements 122.

In one or more embodiments, the data repository 112 includes removal criteria (not illustrated). The removal criteria is similar to the conversion criteria, as described above. In response to determining that the removal criteria is met, the system permanently or temporarily removes at least one restricted-scroll interface element 124. For example, the system may remove a restricted-scroll interface element 124 to reduce an amount of dedicated space being used for a set of restricted-scroll interface elements 124. The now freed-up space within the scrollable container 128 is used to display the fully-scrollable interface elements 122.

The content item rankings 118 include ranks assigned to content items 114. Since content items 114, as described herein, correspond respectively to interface elements, assigning a ranking to a content item 114 is equivalent to assigning a ranking to an interface element corresponding to the content item. Content item rankings 118 may be generated for a subset of the content items 114. For example, the system may generate content item rankings 118 for the subset of content items that correspond to the restricted-scroll interface elements 124. Content item rankings 118 may be used, for example, to select restricted-scroll interface elements for conversion to fully-scrollable interface elements, modification, or removal from the scrollable container 128.

Content item rankings 118 for content items 114 may be based on a relevance, historical usage, predicted usage, priority level, recency, vertical location and/or other metrics associated with the content items 114. In an example, different contents items include different respective buttons. A button that is frequently selected by the current user (or by other users) is ranked higher than a button that is not frequently selected. In another example, a high-priority notice is ranked higher than a low-priority notice. Content item rankings 118 may be generated by the content ranker 106, based on predictions by a machine learning (ML) model as further described below. The content item rankings 118 are assigned to content items 114 relative to other content items that are associated with the same user interface 102. Two or more interface elements may have the same rankings. For example, in a set of (5) restricted-scroll interface elements, (2) restricted-scroll interface elements may be assigned rank one as the highest rank and the other (3) restricted-scroll interface elements may be assigned rank two as the lowest rank.

In one embodiment, the content item rankings 118 are used to select a restricted-scroll interface element 124 for conversion to a fully-scrollable interface element 122. As an example, when the system determines that a region of the GUI used for displaying fully-scrollable interface elements 122 has to be increased, a space reserved for the display of a restricted-scroll interface element 124 has to be freed up. The space is freed up converting the restricted-scroll interface element 124 to a fully-scrollable interface element 122, reducing the size of a restricted-scroll interface element 124 or altogether removing the restricted-scroll interface element 124. The restricted-scroll interface element 124 selected for conversion may a lowest-ranked interface element of a set of restricted-scroll interface elements 124 currently being retained within a viewport of a scrollable container 128.

In an embodiment, the content positioning system 100 includes a content manager 104 in accordance with one or more embodiments. A content manager 104 includes hardware and/or software with functionality to manage content to be presented by the user interface 102. The content manager 104 includes functionality to evaluate conversion criteria 116 to determine whether to convert a restricted-scroll interface element 124 into a fully-scrollable interface element 122. The content manager 104 includes functionality to select a restricted-scroll interface element 124, for conversion to a fully-scrollable interface element 122, from a set of restricted-scroll interface elements 124. The content manager 104 includes functionality to convert a restricted-scroll interface element 124 to a fully-scrollable interface element 122. The content manager includes functionality to execute scrolling operations, in relation to a scrollable container 128, that maintain restricted-scroll interface elements 124 within the scrollable container 128 while adding/removing fully-scrollable interface elements 122 from the scrollable container 128. The functionality of the content manager 104 may be distributed across a content ranker 106, a classification selector 108, a conversion engine 110, and a interface analysis engine 120.

In an embodiment, an interface analysis engine 120 includes hardware and/or software for detecting attributes of a GUI. The GUI attributes include, for example, a space of a GUI (or a scrollable container displayed by the GUI) that is being used for displaying fully-scrollable interface elements 122 and restricted-scroll interface elements 124. Furthermore, the interface analysis engine 120 may determine a size of the space being used for displaying fully-scrollable interface elements 122 and/or a size of the space being used for displaying restricted-scroll interface elements 124. Size measurements as referred to herein may include measurements in a scrollable direction.

In an example, when vertical scrolling is available, size measurements may include a vertical size of the GUI, or of various regions within the GUI. In one embodiment, the interface analysis engine 120 includes functionality to obtain information from the data repository 112. Any component of the system may determine the sizes of a scrollable container and/or regions thereof, and store the sizes in the data repository 112. The interface analysis engine 120 may obtain sizes of the scrollable container and/or regions thereof from the data repository 112. The interface analysis engine 120 may further include functionality to evaluate the GUI attributes in view of conversion criteria 116 to determine whether the conversion criteria 116 has been met.

In an embodiment, the content ranker 106 includes hardware and/or software for ranking content items 114 to generate content item rankings 118 described above. The content ranker 106 may access metadata corresponding to content items associated with each of a set of restricted-scroll interface elements. The metadata may indicate a relevance, historical usage, predicted usage, priority level, recency, and/or other metrics associated with each content item. The content ranker 106 may then rank the content items/set of restricted-scroll interface elements based on the corresponding metadata.

The content ranker 106 may, for example, rank system error alerts higher than an instruction explaining an application feature. The ranker 106 may analyze keywords, topics, and context to determine how closely the content item matches the user's predicted behavior. One of the factors in ranking the items to display may be content item quality. For certain types of content item 114, like event updates for example, recency can be a factor in ranking, where recent content item may be prioritized over older content item.

In one embodiment, the content ranker 106 considers a user's profile including past behavior, preferences, and interactions to personalize the content item rankings 118. This user profile-based ranking helps deliver content item that is tailored to the individual user's interests. The content ranker 106 may rank content items 114 based on corresponding content scores determined by a machine learning (ML)

model. The ML model may be a computational algorithm or mathematical representation that is designed to recognize patterns or make predictions about the relevance or expected usage of content items 114. Different algorithms may be designed for different types of tasks, such as classification, regression, clustering, etc. During a training phase, the users' past behavior, preferences, and interactions along with content items, and content item scores are used to train the ML model to generate content item scores. During an application phase, the ML model is applied to a current user's behavior, preferences, and interactions along with content items to be ranked. The ML model generates content items scores which in turn are used to rank the content items.

Popularity metrics, like the number of views or social media shares, might influence the content item rankings 118. Content item 114 that has high levels of user engagement, such as likes, comments, and shares, may be ranked higher. The higher ranking may indicate that the content item resonates with users and is worth promoting, and such ranking may be used to update the ML model.

In one embodiment, the content ranker 106 may interact with the ML model by using the ML model's predictions to generate content item rankings 118 for content item selection. The ML model may be continually updated based on the user's detected behavior. At various iterations of the ML model training, the ranker 106 may modify the ranking of the content item 114 in accordance with the updates made by the ML model. The system may receive feedback on predictions/scores generated by the ML model. Based on the feedback, the system generates updated training data to retrain or further train the ML model. The system may evaluate the ML model using various metrics that measure the ML model's accuracy, precision, recall, F1 score, and other relevant indicators depending on the task.

In an embodiment, the classification selector 108 includes hardware and/or software to reclassify an interface element as a fully-scrollable interface element 122 or a restricted-scroll interface element 124. The classification selector 108 may further reclassify a restricted-scroll interface element 124 as a partially-scrollable interface element or a non-scrollable interface element. The classification selector 108 uses the content item rankings 118 generated, for content items, by the content ranker 106 to determine how to reclassify an interface element. In an example, the data analysis engine 120 may determine that 100 pixels of additional vertical space needs to be freed up for display of fully-scrollable interface elements 122 for meeting the requirements of the conversion criteria 116. The system determines that the 100 pixels of vertical space maps to n restricted-scroll interface elements. The classification selector 108 may receive input from the interface analysis engine 120 indicating that n restricted-scroll interface elements have to be converted to fully-scrollable interface elements in order to meet the requirements specified in the conversion criteria 116. The classification selector 108 selects n restricted-scroll interface elements 124 with a lowest rank, in the content item rankings 118, for conversion to fully-scrollable interface elements 122. The restricted-scroll interface elements 124 may be converted to fully-scrollable interface elements altogether or one at a time until 100 additional pixels of vertical space is freed up for display of the fully-scrollable interface elements 122.

The classification selector 108 may determine the classification based further on contextual information. For example, the classification selector 108 may determine the classification based on whether a scroll operation is being actively executed and/or a type of the scroll operation being actively executed. The classification selector 108 may re-classify interface elements in response to changes in the contextual information.

In an embodiment, the conversion engine 110 includes hardware and/or software to (a) convert a restricted-scroll interface element to a fully-scrollable interface element and/or (b) convert a fully-scrollable interface element to a restricted-scroll interface element. In an example, the conversion engine 110 may configure a flag or other metadata associated with the interface element to indicate the classification selected by the classification selector 108. The conversion engine 110 may configure a re-classification of an interface element as a permanent re-classification or a temporary re-classification. A temporary re-classification is configured to revert back to an original classification in response to detection of a triggering condition such as the end of a scrolling operation. Other examples of triggering conditions may include scrolling in a different direction, a resizing of a viewport, a resizing of a region within the viewport, or a removal of another sticky interface element. A sticky interface element may be removed, for example, because the corresponding content is no longer applicable. In another example, a sticky interface element may be removed as a result of a conversion of the sticky interface element to a non-sticky interface element that results in removal from the viewport. Some triggers may be combined. For example, when a viewport is resized, the system may analyze conversion criteria to determine when an interface element should be classified as a fully-scrollable interface element or a restricted-scroll interface element. Alternatively, or additionally, the temporary re-classification is configured to revert back subsequent to the passage of a particular period of time since the conversion of the interface element.

In an embodiment, the content manager 104 may modify a size of a restricted-scroll interface element while maintaining the "stickiness" or classification as a restricted-scroll interface element. Content manager 104 may, for example, reduce a size of the restricted-scroll interface element. The content manager 104 may use the freed-up space, due to the size reduction of the restricted-scroll interface element, for displaying fully-scrollable interface elements.

4. Selectively Converting Restricted-Scroll Interface Elements or Fully-Scrollable Interface Elements to Fully-Scrollable Interface Elements FIG. 2 illustrates an example set of operations for selectively converting restricted-scroll interface elements to fully-scrollable interface elements, in accordance with one or more embodiments. One or more operations illustrated in FIG. 2 may be modified, rearranged, or omitted all together. Accordingly, the particular sequence of operations 200 illustrated in FIG. 2 should not be construed as limiting the scope of one or more embodiments.

Initially, a system presents a GUI displaying a scrollable container associated with a set of interface elements (Operation 202). The set of interface elements includes a set of scrollable interface elements and a set of one or more restricted-scroll interface elements. Each of the set of restricted-scroll interface elements may be maintained within a viewport of the scrollable container, thereby requiring a dedicated amount of space within the viewport. Non-scrollable interface elements are maintained within the viewport, regardless of the direction of any scrolling operation. Partially-scrollable interface elements are maintained within the viewport if the direction of the scrolling operation does not allow for the partially-scrollable interface elements to be removed from the viewport of the scrollable container. Space within the viewport, other than the dedicated space for the restricted-scroll interface elements, may be used to display the fully-scrollable interface elements. Often, the amount of space used for displaying the fully-scrollable interface elements is insufficient to concurrently display all of the fully-scrollable interface elements. Accordingly, a portion of the fully-scrollable interface elements are displayed at any given time within a viewport of the scrollable container. Non-displayed portions may be accessed by scrolling.

In an embodiment, the GUI receives a command initiating a scrolling operation in relation to the scrollable container (Operation 204). The GUI may receive the command, initiating the scrolling operation, via a scroll bar. As an example, a user drags a button on a scroll bar displayed within the GUI to initiate the scrolling operation. In another example, a user swipes a physical screen displaying the GUI. The swiping action initiates a scrolling operation with respect to the GUI. In another example, a user selects up or down arrows on a scroll bar to initiate the scrolling operation. In another example, the system detects two fingers concurrently moving along a trackpad for initiating the scrolling operation. In another example, the system detects up or down arrows of a keyboard as user input for initiating the scrolling operation.

When the scrolling operation is received, the system may publish a scroll event in an event stream. A consumer of the event stream that receives the scroll event may determine that the scroll event has been initiated. The consumer of the event stream may trigger operations in response to detecting the scroll event. For example, the consumer may trigger operations, as described below, to determine to analyze interface elements based on a conversion criterion, convert restricted-scroll interface elements to fully-scrollable interface elements, modify display sizes of interface elements, and/or remove interface elements from the GUI.

In an embodiment, the system determines whether one or more interface element conversion criteria are met based on the attributes of the scrollable container (Operation 206). Operation 206 may be triggered by scrolling operation 204. Alternatively, or additionally, operation 206 may be triggered by a change in a size of the viewport of the scrollable container. Alternatively, or additionally, operation 206 may be triggered by a change in a number of restricted-scroll interface elements within the viewport. Alternatively, or additionally, operation 206 may be triggered by a change in amount of space being used by restricted-scroll interface elements, or an amount of space being used by the fully-scrollable interface elements.

The system may determine attributes of the scrollable container by analyzing metadata associated with the scrollable container, or code associated with scrollable container. For example, the system may compute the amount of space used for display of the fully-scrollable interface elements by analyzing source code, configuration data, or metadata associated with the fully-scrollable interface element. The system may determine the amount of space used for fully-scrollable interface elements by subtracting a dedicated amount of space for display of restricted-scroll interface elements from a total amount of space associated with the scrollable container. The system may scrape the GUI to identify the interface elements and characteristics thereof including the amount of space for various regions of the scrollable container.

The system compares the attributes of the scrollable container to the condition(s) specified by interface element conversion criterion for triggering an interface element conversion as described below with reference to operations 208 and 210. In an example, the system determines that an interface element conversion criterion has been meet by determining that a space for displaying fully-scrollable interface elements does not meet a minimum size. In another example, the system determines that an interface element conversion criterion has been meet by determining that a space for displaying a set of one or more restricted-scroll interface element exceeds a maximum size.

If the interface element conversion criterion is met in Operation 206, the system selects one or more restricted-scroll interface elements for conversion to fully-scrollable interface elements (Operation 208). As explained above, conversion of a restricted-scroll interface element to a fully-scrollable interface element results in reducing an amount of dedicated space being used for display of restricted-scroll interface elements. The freed-up space may then be used for display of fully-scrollable interface elements. In a simple example, there is a single restricted-scroll interface element being displayed in a viewport of a scrollable container. The single restricted-scroll interface element is selected for conversion to a fully-scrollable interface element.

In another scenario, there may be multiple restricted-scroll interface elements being displayed in a scrollable container. The system selects one or more of the restricted-scroll interface elements for conversion to fully-scrollable interface elements. The system may determine an amount of space that has to transferred from being used for display of restricted-scroll interface elements to being used for display of fully-scrollable interface elements. As an example, the system may determine that a vertical size of a first display region for the fully-scrollable interface elements needs to be increased by one inch to meet a minimum size requirement for the first display region. This increase in one inch for the first display region is implemented by a decrease in one inch of a second display region that is being used for displaying restricted-scroll interface elements. The system identifies a target number n of the restricted-scroll interface elements to be converted to meet the change-in-size determinations for the display regions. Furthermore, since a size of restricted-scroll interface elements may vary, the target number n is dependent on a size of the restricted-scroll interface elements being selected for conversion.

In an embodiment, the system selects the restricted-scroll interface elements for conversion based on rankings associated with the restricted-scroll interface elements (or with content items thereof). The lowest ranked restricted-scroll interface elements may be selected for conversion until a sufficient number of restricted-scroll interface elements has been selected for meeting the change-in-size determinations.

In an embodiment, the system converts the selected restricted-scroll interface element(s) to fully-scrollable interface elements (Operation 210). Converting an interface element from a restricted-scroll interface element to a fully-scrollable interface element may be referred to herein as "unsticking" the interface element as the interface element no longer sticks to the viewport of the scrollable interface. Once converted, the converted fully-scrollable interface element can be moved into and out of a viewport of the scrollable interface similar to other fully-scrollable interface elements.

The conversion of an interface element from a restricted-scroll interface element to a fully-scrollable interface element may include modifying a flag associated with the interface element. The flag is modified from indicating a value corresponding to restricted-scroll interface elements to a value corresponding to fully-scrollable interface elements. In another example, the conversion may include modifying metadata that is stored in associated with the interface element. The system modifies the metadata from indicating that the interface element is a restricted-scroll interface element to indicating the interface element is a fully-scrollable interface element.

The conversion of the interface element from a restricted-scroll interface element to a fully-scrollable interface element may result in positioning of the interface element within a particular ordered set of fully-scrollable interface elements. The converted fully-scrollable interface element is synchronized with a corresponding home position. The converted fully-scrollable interface element may be accessed by scrolling through the ordered set of the fully-scrollable interface elements until a home position corresponding to the interface element is within the viewport.

The conversion of the interface element may be permanent or temporary. When conversion is temporary, the interface element may be reversed from a fully-scrollable interface element back to a restricted-scroll interface element in response to a triggering condition. The temporary conversion may be reversed in response to detecting a triggering condition for reversal. As an example, the initial conversion may be implemented during a downward scrolling operation. When the system detects an upward scrolling operation, the system reverses the conversion. Alternatively, the system may reserve the conversion as soon as the downward scrolling operation is stopped, i.e., scrolling pauses. The temporary conversion may be reversed based on a passage of a particular time period subsequent to the conversion. For example, the system may be configured to reverse the conversion (10) seconds subsequent to performing the conversion. Other examples of triggering conditions for reversing the conversion may include scrolling in a different direction, a resizing of a viewport, a resizing of a region within the viewport, or a removal of another sticky interface element. A sticky interface element may be removed, for example, because the corresponding content is no longer applicable. In another example, a sticky interface element may be removed as a result of a conversion of the sticky interface element to a non-sticky interface element that results in removal from the viewport. Some triggers may be used in combination to trigger a reversal. For example, when a viewport is resized, the system may analyze conversion criteria. The system analyzes the conversion criteria to determine whether an interface element should be classified as a fully-scrollable interface element or a restricted-scroll interface element. The analysis may or may not lead to reversing a conversion.

The conversion may be reversed based on a content item corresponding to a converted interface element. As an example, a restricted-scroll interface element displays the latest status of a system. Subsequent to conversion of an interface element from a restricted-scroll interface element to a fully-scrollable interface element, the converted fully-scrollable interface element is removed from the viewport via a scrolling operation. After removal of the converted fully-scrollable interface element from the viewport, the system detects an update to the status field corresponding to the converted interface element. In response to detecting the update, the system converts the interface element from the fully-scrollable interface element back to a restricted-scroll interface element. Converting the interface element back to the restricted-scroll interface element results in displaying the restricted-scroll interface element in the scrollable container. The displayed restricted-scroll interface element displays the updated status.

As an alternative to or in addition to the conversion operation, the system may modify a selected restricted-scroll interface element(s) by reducing a size of the selected restricted-scroll interface element(s). The reduction in size of the restricted-scroll interface element(s) decreases an amount of space being used to display the restricted-scroll interface element(s). The now-available space is used for displaying the set of fully-scrollable interface element(s). The size modification may be reversed in response to a reversal triggering condition, as described above with reference to conversion reversals. Furthermore, the size modification may be reversed in response to a user selecting the restricted-scroll interface element(s).

As an alternative to or in addition to the conversion operation, the system may remove a selected restricted-scroll interface element(s) altogether from a scrollable container. As an example, the system may temporarily remove a restricted-scroll interface element(s) during a downward scrolling operation such that the restricted-scroll interface element(s) is no longer accessible. The restricted-scroll interface element(s) may be added back to the scrollable container during an upward scrolling operation, or when the downward scrolling operation has paused/completed. Altogether removing the restricted-scroll interface element(s) does not necessarily require any conversion of the restricted-scroll interface element to a fully-scrollable interface element.

During or subsequent to the conversion operation 210, the system executes the scrolling operation by removing the converted fully-scrollable interface element (Operation 212) and scrolling in a new fully-scrollable interface element into the viewport of the scrollable container (Operation 214). While executing the scrolling operation, the system maintains any non-scrollable interface elements within the scrollable container regardless of a direction of the scrolling operation. Furthermore, while executing the scrolling operation, the system maintains partially-scrollable interface elements if the direction of the scrolling operation does not allow for removing of the partially-scrollable interface elements from the viewport of the scrollable container. The partially-scrollable interface elements are stuck to the edge of the scrollable container at which the fully-scrollable interface elements are being removed from the scrollable container. Executing the scrolling operation includes switching from displaying a first subset of the fully-scrollable interface elements to displaying a second subset of the fully-scrollable interface elements. The scrolling operation may include scrolling vertically to display fully-scrollable interface elements above or below currently displayed fully-scrollable interface elements. The scrolling operation may include scrolling horizontally to display fully-scrollable interface elements to the right or left of currently displayed fully-scrollable interface elements. The scrolling direction may depend on the input and device settings. For example, scrolling upward on a touchscreen or mouse scroll wheel may move content item upwards, revealing a content item that was previously off-screen. Executing the scrolling operation may include maintaining a non-scrollable interface element at a fixed position within the scrollable container. In an example, a non-scrollable interface element may move with fully-scrollable interface elements until the non-scrollable interface element reaches top, side, or bottom of a scrollable container, or reaches other restricted-scroll interface elements. Executing the scrolling operation may include moving restricted-scroll interface elements within the scrollable container without removing the restricted-scroll interface elements from the scrollable container. In an example, a partially-scrollable interface element is moved into a viewport from one edge of the viewport and further moved to the opposite edge of the viewport during a scrolling operation. The partially-scrollable interface element is then maintained at that opposite edge of the viewport for the duration of that scrolling operation.

5. Example Embodiment

Figure 3A:
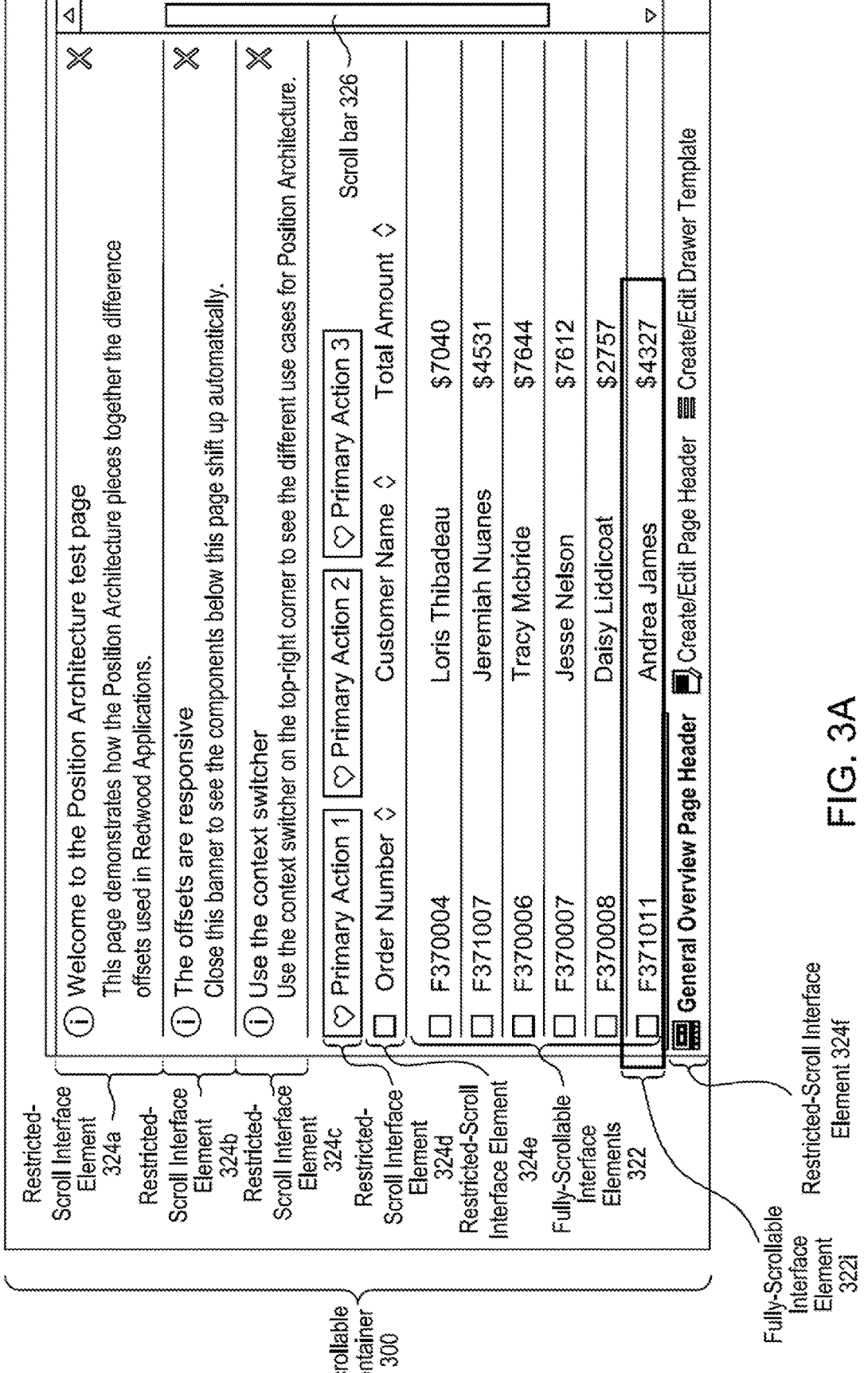

FIGS. 3A-3B illustrate a scrollable container 300 in accordance with one or more embodiments. The scrollable container is provided as an example. Components, layout, and/or functionality associated with the scrollable container 300 should not be interpreted as limiting the scope of any of the claims.

FIG. 3A illustrates a layout of a scrollable container 300 displayed by a GUI at a first time T1. The scrollable container 300 includes a set of restricted-scroll interface elements 324 (e.g., 324a to 324f), and fully-scrollable interface elements 322. The fully-scrollable interface elements 322 include fully-scrollable interface element 322i. The scrollable container 300 is associated with a scroll bar 326 that may be used to provide scrolling commands for executing scrolling operations.

The restricted-scroll interface elements 324 include notices, interface navigation information, titles, etc. The restricted-scroll interface elements 324 have a dedicated amount of display space within the display of scrollable container 300. Restricted-scroll interface elements 324d, 324e, and 324f are ranked higher than restricted-scroll interface elements 324a, 324b, and 324c based on a determination that restricted-scroll interface elements 324d, 324e, and 324f are most likely to be selected by a user. Furthermore, restricted-scroll interface element 324f is a non-scrollable interface element that is ranked higher than restricted-scroll interface elements 324d and 323e that are partially-scrollable interface elements. Restricted-scroll interface elements 324a, 324b, and 324c are partially-scrollable interface elements that are the lowest ranked interface elements. Each of the fully-scrollable interface elements 322 correspond to a respective content item, an order in this particular example. The fully-scrollable interface element 322, for each order, includes the order number, the customer number, and the total amount.

Continuing the above example, the GUI receives a command via the scroll bar 326 to scroll downward and show orders that are sequenced below the fully-scrollable interface element 322i. Based on the command, the system evaluates the conversion criteria and determines additional space is needed for that (3) of the (6) restricted-scroll interface elements need to be converted to fully-scrollable interface elements to provide additional space to display the fully-scrollable interface elements. The conversion of (3) restricted-scroll interface elements to fully-scrollable interface elements would free up sufficient additional space within the scrollable container 300 to display fully-scrollable interface elements. Based on the restricted-scroll interface elements 324a, 324b, and 324c being the lowest ranked of the restricted-scroll interface elements 324, the system converts restricted-scroll interface elements 324a, 324b, and 324c into fully-scrollable interface elements.

FIG. 3B shows the scrollable container 300 at a second time T2, after executing a scrolling operation. Fully-scrollable interface element 322*i* is moved from the bottom of the scrollable container 308 to a middle of the scrollable container 308. Additional fully-scrollable interface elements 322 positioned below the fully-scrollable interface element 322*i* are now displayed. As shown in FIG. 3B, converted interface elements 324*a*, 324*b*, and 324*c* are no longer visible as they have been scrolled out of the scrollable container 300. The remaining three restricted-scroll interface elements 324*d*, 324*e*, and 324*f* are maintained within the scrollable container 300. Furthermore, the space that was previously being used to display restricted-scroll interface elements 324*a*, 324*b*, and 324*c* is now being used to display fully-scrollable interface elements 322.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
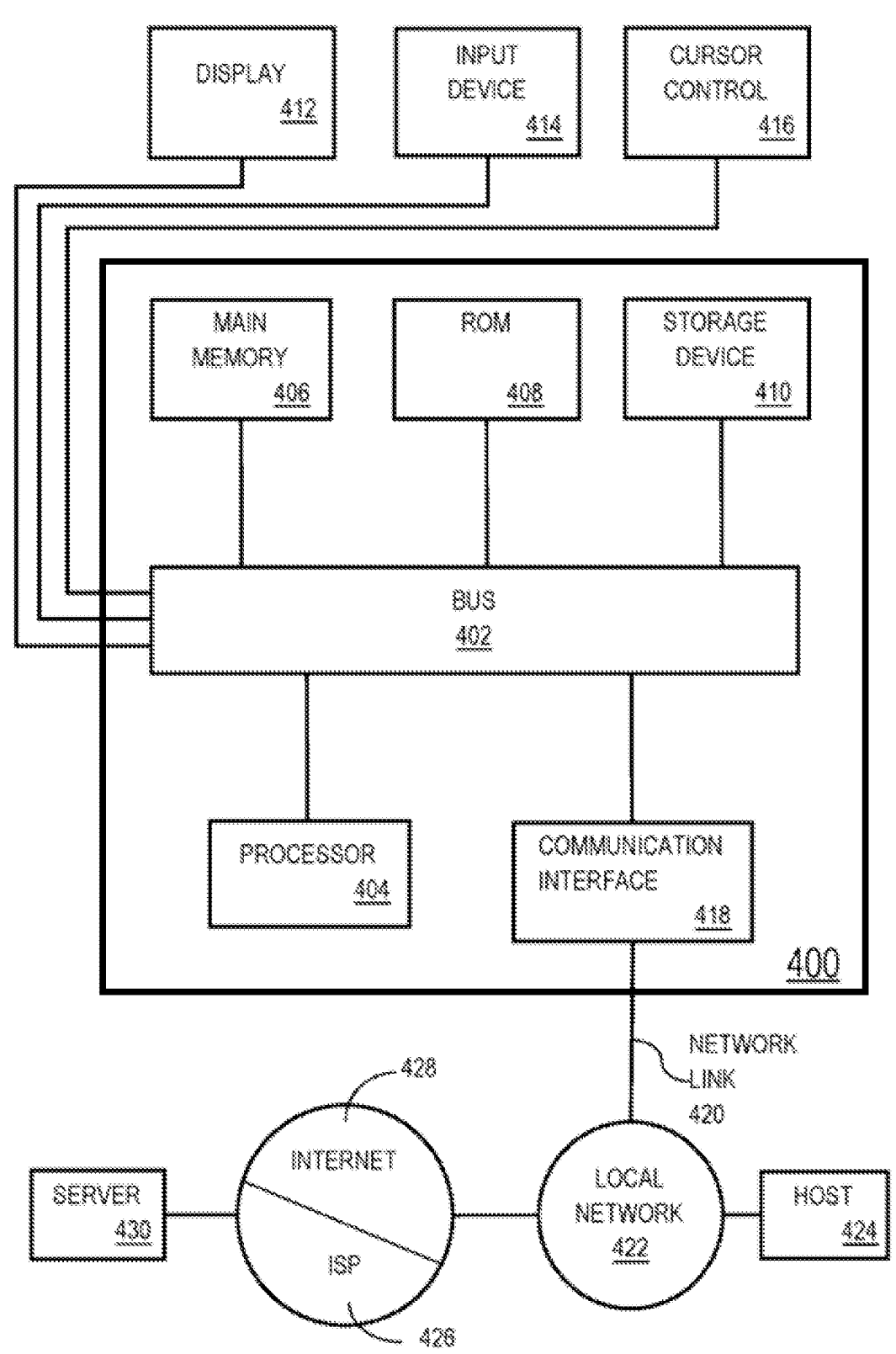
FIG. 4 illustrates a block diagram of a system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content item-addressable memory (CAM), and ternary content item-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 440 might transmit a requested code for an application program through Internet 428, ISP 426, local network 422 and communication interface 418. The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer readable media comprising instructions which, when executed by one or more hardware processors, cause performance of operations comprising:

presenting a Graphical User Interface (GUI) displaying a scrollable container, displaying within a viewport of the scrollable container:

a subset of fully-scrollable interface elements of a set of fully-scrollable interface elements that may be moved, into and out of the viewport of the scrollable container, in response to execution of at least one scrolling operation;

a first restricted-scroll interface element of a set of restricted-scroll interface elements, the first restricted-scroll interface element comprising at least one of:

a partially-scrollable interface element that (a) cannot be scrolled out of the viewport of the scrollable container in response to a first scrolling operation, in a first direction and (b) can be scrolled out of the viewport of the scrollable container in response to a second scrolling operation, in a second direction that is different than the first direction; or a non-scrollable interface element that cannot be scrolled out of the viewport of the scrollable container in response to a scrolling operation;

receiving, by the GUI in relation to the scrollable container, a first scrolling command for execution of the first scrolling;

responsive to determining that an interface element conversion criterion is met: converting the first restricted-scroll interface element to a first fully-scrollable interface element;

wherein converting the first restricted-scroll interface element to the first fully-scrollable interface element comprises temporarily converting the first restricted-scroll interface element into the first fully-scrollable interface element, executing the first scrolling operation at least by:

removing the first fully-scrollable interface element from the viewport of the scrollable container;

scrolling a second fully-scrollable interface element, of the set of fully-scrollable interface elements, into the viewport, and subsequent to removing the first fully-scrollable interface element out of the viewport, re-displaying the first restricted-scroll interface element in the scrollable container in response to a triggering condition.

2. The non-transitory computer readable media of claim 1, wherein determining that the interface element conversion criterion is met comprises determining that a size, of space in the viewport being used for displaying the subset of fully-scrollable interface elements, does not meet a minimum display size criterion.

3. The non-transitory computer readable media of claim 1, wherein determining that the interface element conversion criterion is met comprises determining that a size, of space in the viewport being used for displaying at least a subset of the set of restricted-scroll interface elements, exceeds a maximum display size criterion.

4. The non-transitory computer readable media of claim 1, wherein the operations further comprise:

responsive to determining that the interface element conversion criterion is met: reducing a display size of a second restricted-scroll interface element, of the set of restricted-scroll interface element, that is being displayed in the viewport of the scrollable container.

5. The non-transitory computer readable media of claim 1, wherein the operations further comprise determining the interface element conversion criterion based on a size of the scrollable container.

6. The non-transitory computer readable media of claim 1, wherein the operations further comprise determining the interface element conversion criterion based on a size of the scrollable container in relation to a size of the GUI.

7. The non-transitory computer readable media of claim 1, wherein the triggering condition is execution of a second scrolling operation in an opposite direction from the first scrolling operation.

8. The non-transitory computer readable media of claim 1, wherein the operations further comprise selecting the first restricted-scroll interface element for converting to the first fully-scrollable interface element responsive to determining that the first restricted-scroll interface element has a lowest rank of a displayed subset of the set of restricted-scroll interface elements.

9. The non-transitory computer readable media of claim 1, wherein the operations further comprise selecting the first restricted-scroll interface element for converting to the first fully-scrollable interface element responsive to:

applying a machine learning model to determine that the first restricted-scroll interface element has a lower likelihood of user selection than any of a displayed subset of the set of restricted-scroll interface elements.

10. The non-transitory computer readable media of claim 1, wherein the operations further comprise:

detecting an update associated with a content item corresponding to the first fully-scrollable interface element;

responsive to detecting the update, converting the first fully-scrollable interface element back to the first restricted-scroll interface element;

displaying the restricted-scroll interface element in the viewport of the scrollable container.

11. The non-transitory computer readable media of claim 1, wherein the operations further comprise determining whether the interface element conversion criterion is met responsive to detecting a change in one or more attributes of the scrollable interface.

12. The non-transitory computer readable media of claim 1, wherein the operations further comprise determining whether the interface element conversion criterion is met responsive to detecting a change in one or more attributes associated with a subset of restricted-scroll interface elements displayed in the scrollable interface.

13. The non-transitory computer readable media of claim 1, wherein the first restricted-scroll interface element comprises a partially-scrollable interface element that (a) cannot be scrolled out of the viewport of the scrollable container in response to a first scrolling operation in a first direction and (b) can be scrolled out of the viewport of the scrollable container in response to a second scrolling operation in a second direction that is different than the first direction.

14. A method comprising operations as recited in any of claims 1-6, 7-12, and 13.

15. A system comprising at least one device including a hardware processor, the system being configured to perform operations as recited in any of claims 1-6, 7-12, and 13.

\* \* \* \* \*